May 15, 1956 A. W. ECKSTROM ET AL 2,745,484
CONTINUOUS DENSITY CONTROL OF A LIQUID
Filed March 27, 1950 3 Sheets-Sheet 1

INVENTORS
Albert W. Eckstrom
Graham Hill
BY
Parker Prichnor Turner
Attorneys.

May 15, 1956  A. W. ECKSTROM ET AL  2,745,484
CONTINUOUS DENSITY CONTROL OF A LIQUID
Filed March 27, 1950  3 Sheets-Sheet 2

INVENTORS
Albert W. Eckstrom
Graham Hill,
BY
Parker, Prochnow & Farmer,
Attorneys.

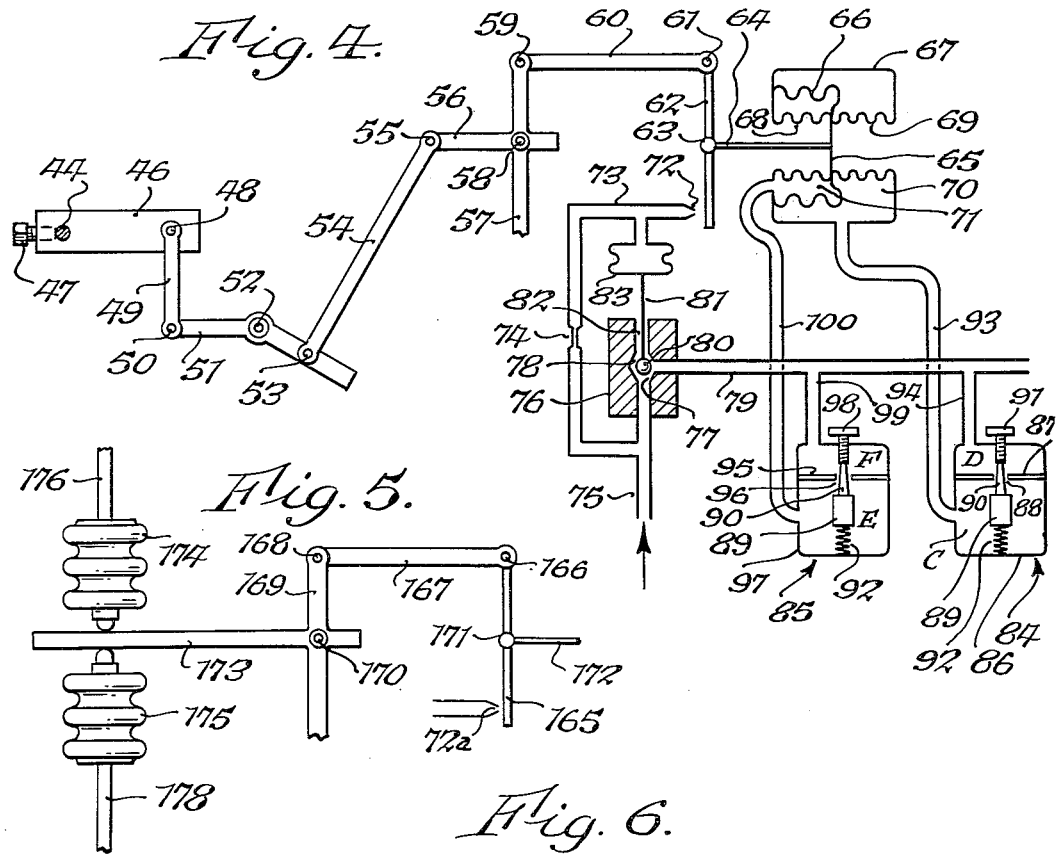

United States Patent Office 2,745,484
Patented May 15, 1956

2,745,484

CONTINUOUS DENSITY CONTROL OF A LIQUID

Albert W. Eckstrom, Buffalo, and Graham Hill, Kenmore, N. Y., assignors, by mesne assignments, to Blaw-Knox Company, Pittsburgh, Pa., a corporation of Delaware Application March 27, 1950, Serial No. 152,212

14 Claims. (Cl. 159—44)

This invention is a continuation-in-part of our United States application Serial No. 604,464, now abandoned, filed July 11, 1945, and relates to density controllers by which one may provide a liquid having a predetermined density, and which density may be controlled or regulated accurately. A liquid of desired density can be prepared by evaporating a dilute liquid to the desired density, or a very concentrated liquid may be diluted with another liquid until a predetermined density is obtained, or any two liquids of different densities may be mixed or blended with or without evaporation in order to obtain a resultant liquid of desired density. A very extensive use for such density controllers is in connection with the concentration of liquids by evaporation of vaporizable parts thereof until the desired degree of concentration is obtained. The concentration of grape juice and citrus fruit juices which are subsequently frozen, and the concentration of tomato juices are examples of extensive commercial applications of the invention. Various attempts have heretofore been made to regulate the density automatically in a density operating system, such as to control the density of the concentrate which is discharged from the evaporator in a more or less continuous stream, but density controllers heretofore used have been unsatisfactory in that they were not sufficiently sensitive and accurate and there were wide fluctuations in the density of the discharged concentrate.

It is at all times desirable to maintain the maximum evaporating rate of an evaporator, regardless of seasonal or occassional fluctuations of the concentration of the stock or feed liquid. For example, in concentrating natural products, such as citrus fruit juices and tomato juices, the concentration of the feed or stock liquid varies with climatic conditions, soil conditions and the variety of the fruit or plant from which the liquid is obtained. The evaporator is designed for the lowest concentration of feed and the maximum steam pressure which is permissible in view of the nature of the product handled. With an increase in the concentration of the feed, a concentration of the discharge will also increase, but this can be corrected by a reduction in the steam pressure and the rate of evaporation in order to maintain a constant rate of discharge. Since this would result in the operation of the evaporator at less than its maximum capacity, it is preferable to increase the discharge rate instead of decreasing the rate of evaporation.

Since a product of uniform concentration is desired, this discharge rate should preferably change without a change in concentration. This can best be done by an automatic control of the density of the discharged liquid. The control should be sensitive and quick in response, but its action should give smooth or proportionate changes rather than intermittent changes. The valves and pumps, by the manipulation of which the rate of flow through the evaporator may be varied in order to maintain a uniform density of the discharged liquid, require substantial operating forces to initiate the changes and overcome inertia and friction of the movable parts, and when the force become sufficient the controls are likely to move too far and produce a sudden or abrupt change in the flow of liquid through the evaporator, with the result that substantial fluctuations in the density are apt to occur. This was one of the main objections to previous density controllers.

An object of this invention is to improve the control of a density of a liquid passing through any apparatus by which its concentration is varied; with which fluctuations in the density will be kept within exceptionally close limits.

Another object of the invention is to provide an improved density control of a continuously moving liquid; with which the control will be fully automatic, sensitive, smooth and accurate, and provide a resultant liquid which will have a minimum of variation in density; and which will be sanitary, relatively simple, compact and inexpensive.

Another object of the invention is to provide an improved automatic control for regulating the density of the output or discharge of an evaporator; with which the density may be effectively, smoothly and sensitively controlled while maintaining the maximum evaporating rate of the evaporator, regardless of seasonal or occasional fluctuations in the concentration of the ingoing liquid, and when handling different products; with which the density control will be fully automatic and with which the danger of contamination of the product and its oxidation by contact with air are avoided.

Another object of the invention is to provide an improved liquid density regulator and controller which may be easily cleaned and kept sanitary, so as to be useful for handling of food products; which will have maximum simplicity and ruggedness, with parts that may be subject to wear or actual breakage easily replaceable; which will utilize as far as possible apparatus already available on the open market; which will be precise and sensitive to small variations in density; with which the standard or mean density of the liquid may be adjusted easily and quickly, so as to adapt it for use with different products; which will be subject to a minimum of errors caused by viscosity, suspended solids or other properties of the liquid being handled; with which uniformity in the density may be easily obtained and automatically reset for substantial changes in the rate of liquid flow; and which will be relatively simple, compact and inexpensive.

Various other objects and advantages will be apparent from the following description of one embodiment of the invention, and the novel features will be particularly pointed out hereinafter in connection with the appended claims.

In the accompanying drawings:

Fig. 4 is a schematic diagram of part of the control mechanism shown in Figs. 2 and 3;

Fig. 5 is a diagram illustrating part of the mechanism shown in Fig. 1; and

Fig. 6 is a schematic diagram and partial elevation of another part of the control apparatus shown in Fig. 3.

Figure 1:
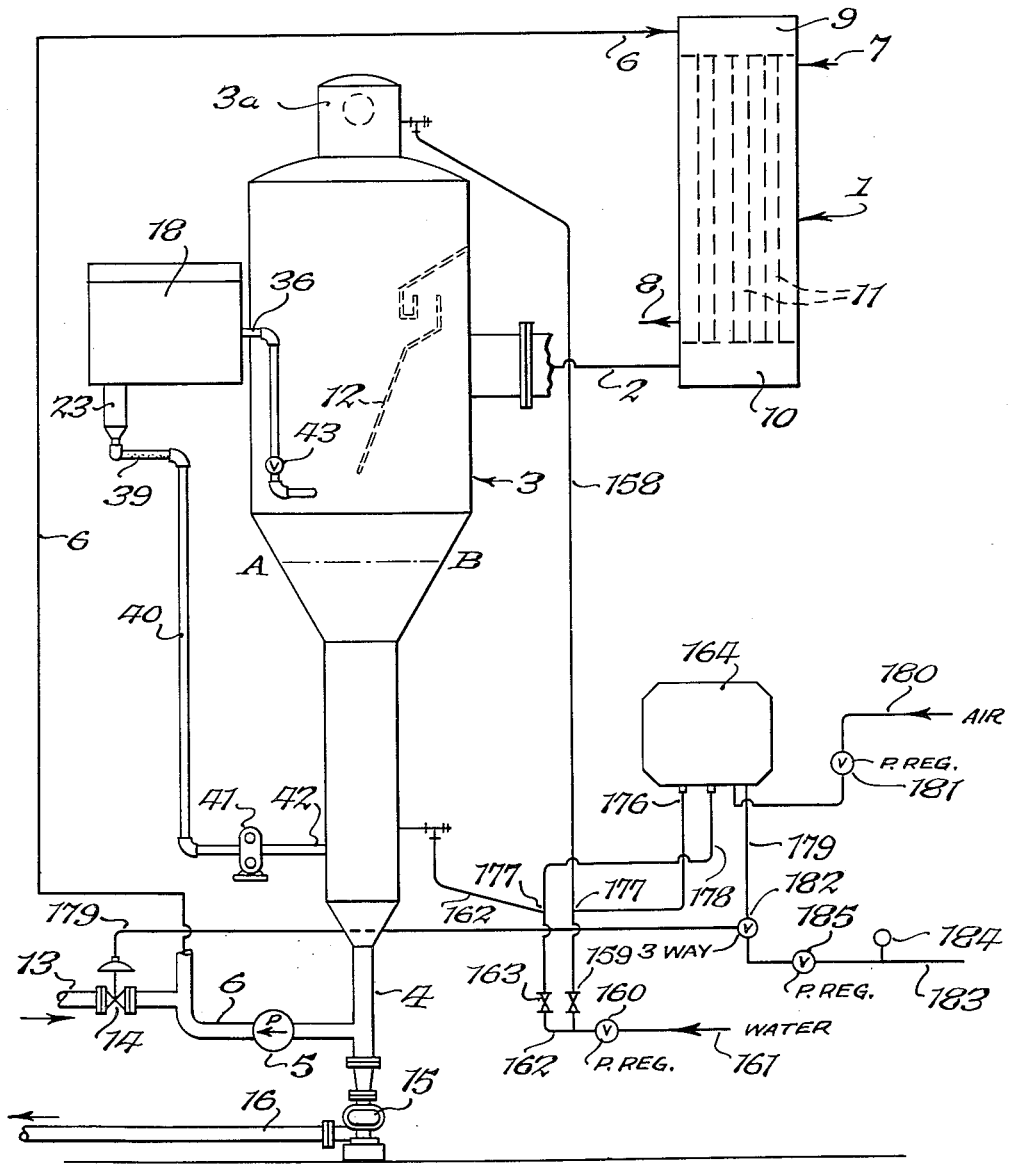
Fig. 1 is a side elevation of an evaporator of the continuous type, to which is applied a density controller in accordance with this invention, many of the parts being shown rather diagrammatically.

In the illustrated embodiment of the invention, and referring first particularly to Fig. 1, the evaporator shown by way of example is of the single effect, downflow type of continuous evaporator having a steam chest or heater 1, connected at its lower end by a pipe 2 to a flash chamber or separator 3. Any other suitable type of evaporator may be employed. A vapor and gas outlet 3a leads from the upper part of chamber 3 to a condenser for the vapors (not shown). A pipe 4, which is connected to the lower end of the chamber 3, is connected to the intake port of a circulating pump 5, and the delivery port of the pump 5 is connected to a pipe 6 which leads to the upper end of the steam chest 1. Steam is admitted to the steam chest through pipe 7 and condensate removed through pipe 8. Header chambers 9 and 10 in the top and bottom of the steam chest 1 are connected to each other through the chamber of the steam chest by a plurality of tubes 11. The pipe 6 is connected to the chamber 9 and pipe 2 to the chamber 10. This is a typical downflow type of evaporator, and the mixture of liquid and vapor as discharged from pipe 2 into separator 3 impinges against a baffle 12 which serves to direct the liquid downwards towards the bottom of the separator 3 and separate the vapor from the liquid. Fresh liquid to be concentrated is supplied through pipe 13, controlled by a diaphragm-operated valve 14, which is connected to the pipe 6.

Also connected to the pipe 4 is the intake port of a pump 15, which is preferably of the positive discharge type, and the outlet port of the pump 15 is connected to a pipe 16 for delivering the concentrated liquid. Suitably supported on the side of the flash chamber or separator 3 of the evaporator is a housing 18 in which is disposed means for controlling the density of the concentrated liquid.

Figure 2:
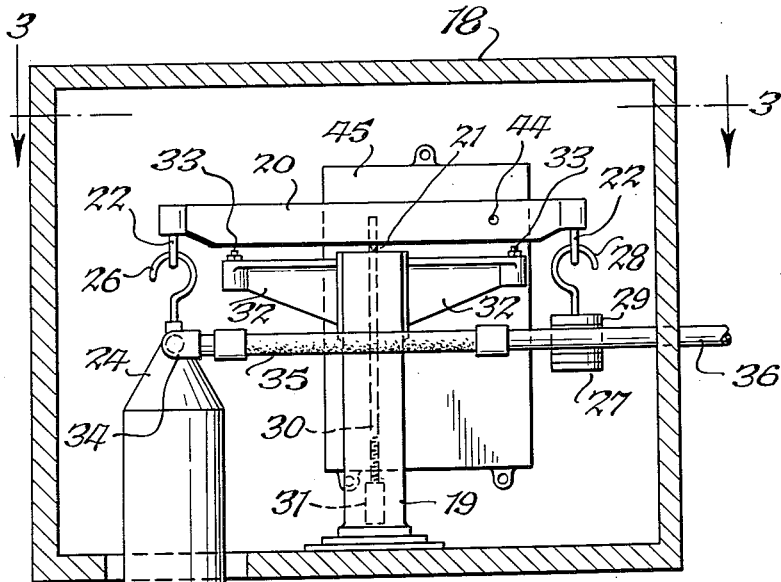
Fig. 2 is a sectional elevation through part of the controlling mechanism shown in Fig. 1.

Referring next to Fig. 2, within this housing 18, a pedestal 19 on its top, rockably mounts a scale beam 20 on a fulcrum 21. The ends of the beam 20 carry depending eyes 22. A constant volume vessel 23 having a conical top 24 and a conical bottom 25 is provided at its upper end with a hook 26 which is hooked through the eye 22 at one end of the beam 20 so as to be suspended freely therefrom. An adjustable weight 27 is provided with a hook 28 which engages through the other eye 22 at the other end of the beam 20. The weight 27 may, for convenience, include a plurality of weights 29 which are detachably connected to the hook 28 as in beam scales, so as to make it possible to vary the total weight merely by adding and subtracting the individual weights 29. Depending from the beam 20, in alinement with the rocking fulcrum 21, is an arm 30 carrying a weight 31 on its lower end which is threaded on the arm 30 for vertical adjustment therealong. The arm 30 and the weight 31 constitute an adjustable pendulum whereby the center of gravity of the balance mechanism may be regulated vertically with respect to the fulcrum 31 and the sensitivity of the balance may be adjusted for any desired calibration. The pedestal 19 is provided with arms 32 which extend beneath the arms of the beam and carry vertically adjustable stops 33 by which the rocking of the beam 20 may be limited.

Figure 3:
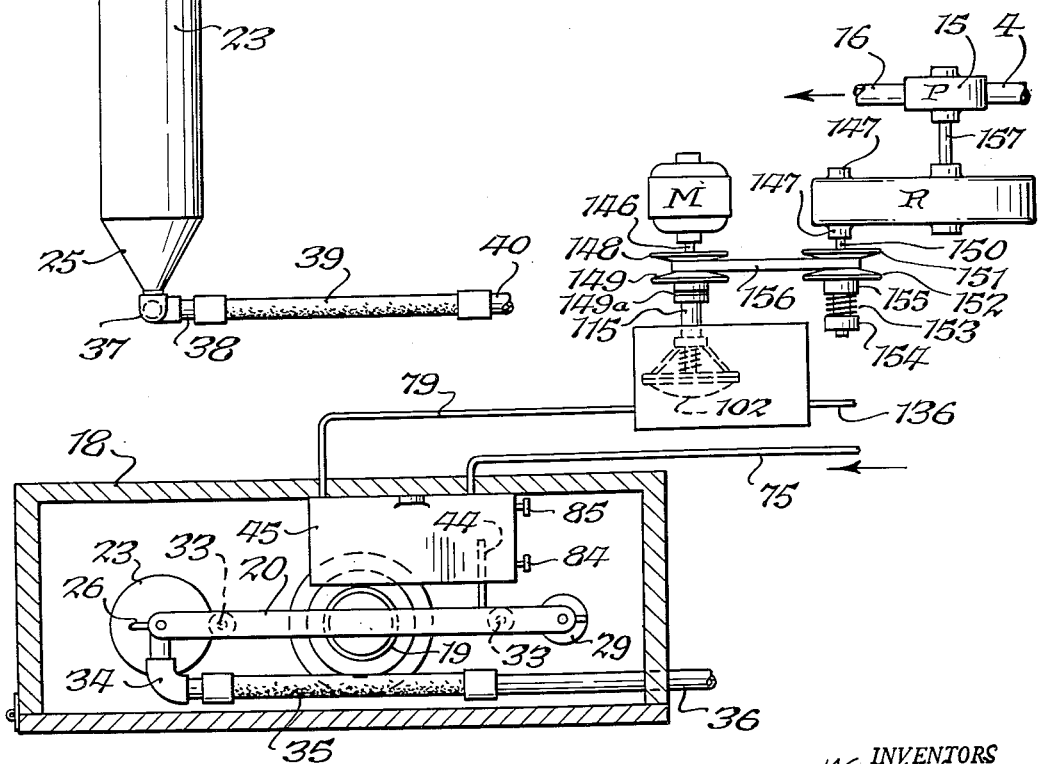
Fig. 3 is a sectional plan of the mechanism shown in Fig. 2, the section being taken approximately along the line 3—3 of Fig. 2 and controlling mechanism by which the rate of operation of the discharge pump may be varied.

Extending laterally from the upper end of the conical top 24 is a tubular coupling 34, see Fig. 3, so that the coupling serves as a horizontal outlet for the upper end of the container 23. This coupling 34 extends horizontally and is connected to one end of a flexible hose or pipe 35 which extends horizontally when the weigh beam 20 is horizontal, and the other end of this hose or flexible pipe 35 is connected to a pipe 36. The hose 35 may be made of flexible rubber tubing or may be a flexible conduit or other type which will flex quite freely with a minimum of resistance. A tubular coupling 37 similarly extends horizontally from the lower end of the bottom 25 of the vessel 23, and it also has a horizontally extending portion 38 which is connected to one end to a flexible rubber hose or other freely flexible conduit 39 that also extends horizontally and is coupled to a pipe 40. The pipe 40 is connected (Fig. 1) to the outlet port of a pump 41 which is preferably a centrifugal pump, and the inlet port of that pump is connected by a pipe 42 to the separator or flash chamber 3 below the desired liquid level in the chamber 3. A valve 43 in the pipe 36 controls the proper amount of liquid flowing through constant volume vessel 23, and maintains a light back pressure to keep line 36 filled.

The liquid level in the chamber or separator 3 is designated for convenience by the line A—B in Fig. 1. This liquid level A—B can be varied vertically to some extent, but for any operation it should remain constant. The upper pipe 36 depends for a distance below the lower end of the vessel 23 and then it is connected to the interior of the chamber or separator 3 above the liquid level therein, such as above the liquid level line A—B. The pump 41 is a non-pulsating, positive displacement type of pump, such as a gear pump, which is continuously operated by a suitable motor, not shown. This pump thus withdraws liquid from the bottom of the separator 3, circulates it upwardly through the vessel 23, which is suspended on one end of the weigh beam, and then back to the separator above the liquid level therein. The liquid in the receptacle or vessel 23 is thus at all times responsive to, and represents a fair and continuing sample of the liquid in the lower part of the separator 3. The liquid passing through the vessel 23 is thus a correct sample or representation of the concentrated liquid in the separator 3 at all times, and if this liquid is weighed continuously, any deviation in the density of this liquid being so circulated through the vessel 23, will immediately cause a rocking of the beam 20.

The vessel 23 may advantageously be made of transparent material with the conical ends of metal. There should be sufficient weights 29 on one end of the beam to balance the vessel 23 and its contents when the liquid has the desired density, and which may be referred to as the mean or selected density. If the density of the liquid circulating through the vessel 23 varies, it will be indicated by a rising or falling of the vessel 23, and since the flexible hose connections 35 and 39 are freely flexible and extend generally horizontally from the container 11, they will offer a minimum and, in fact a relatively negligible resistance to the limited, vertical movements of the vessel 23. The deflection of the weigh arm 20 from the horizontal position will indicate the manner and to some extent variation of the density of the circulating liquid from the mean or selected density.

Since the tilting of the balance of weigh arm 20 corresponds to the character and amount of deviation of the density of the circulating liquid from the selected or mean density desired, an attendant could manually regulate the rate of operation of the pump 15 which removes concentrated liquid from the evaporator in a manner to bring the density of the liquid circulating through the vessel 23 back to normal by a change in liquid feed and corresponding change in rate of flow of stock into the evaporator, to that which would cause the balance arm or beam 20 to resume a horizontal position. In accordance with the preferred embodiment of this invention, the control is automatically accomplished without manual intervention as will be explained presently.

The balance arm or beam 20 is provided with a laterally extending pin 44, see Figs. 2 and 3, intermediate the fulcrum 21 and an end of the beam. This pin 44 extends into a casing 45 which is provided within the housing 18. Within the casing 45 is a control mechanism, shown in Fig. 4, which controls a pilot fluid that is utilized to produce variations in the speed of the operation of the pump 15. Referring now particularly to Fig. 4, the mechanism contained in the casing 45 and shown in Fig. 4 is substantially identical with that which may be purchased from Taylor Instrument Companies of Rochester, New York, and identified by the name "Taylor Fulscope Recording Controller," Series 115R to 124R, also disclosed in a bulletin of instructions for that instrument copyrighted in 1939 by Taylor Instrument Companies, identified by the number 92037. It is also disclosed in United States patent to Tate et al. No. 2,361,885 of October 1, 1944, to which reference may be had for a complete disclosure. In the mechanism disclosed in the Tate et al. patent, a Bourdon coil 7 which is controlled by a temperature responsive device, serves to move a link 9 endwise in order to control the activity of the regulator.

In adapting that mechanism to the present device, the Bourdon coil of the Tate patent is removed and the link 9 of that patent is moved endwise by the pin 44 of this application via the linkage 46, 49, 51. This is illustrated in Fig. 4, where the end of the pin 44 extends into a hole or bore in an arm 46 and is secured therein by a set screw 47. The arm 46 is pivotally connected by pin 48 to one end of a link 49, the other end of which is pivotally connected by pin 50 to one end of a lever 51 which is pivoted at 52 to a suitable frame or support. The other arm of the lever 51 is pivotally connected by a pin 53 to one end of a link 54 that corresponds to the link 9 of the Tate et al. patent. The mechanism operated by the link 54 is actually made in accordance with that shown in the Tate et al. patent, but the mechanism of the Tate patent is shown diagrammatically and simplified in Fig. 4 of this application in order to simplify an explanation of its operative principles.

In Fig. 4, the upper end of the link 54 is pivotally connected by a pin 55 to a laterally extending arm 56 of an indicating pointer 57 which is pivoted at 58 to a suitable frame or support. The pointer 57 is pivotally connected by pin 59 to one end of a link 60, the other end of which is pivotally connected by pin 61 to one end of a baffle or flapper 62. Baffle 62 is also pivotally supported on a shiftable pivot 63. Pivot 63 is carried by a stem 64 that projects from a plate 65 that forms one end of a bellows 66, the other end of which is anchored to a fixed casing 67. The plate 65 is connected to and forms one end of a bellows 68, the other end of which is anchored to the front wall of casing 67 to which the bellows 66 is connected. A similar bellows 69 is attached to the plate 65 and extends to the casing 67 at the rear. This provides two bellows chambers 70 and 71. When there is pressure in the bellows chamber 70, the plate 65 and the stem 64 will be pushed to the left in Fig. 4, and when there is pressure in the bellows chamber 71, the plate 65 and stem 64 will be pushed to the right in Fig. 4.

If the pressure in the chamber 70 is greater than that in chamber 71, the plate 65 will be moved to the left, whereas if the pressure in chamber 71 is greater than in chamber 70, the plate 65 will be moved to the right. Thus the pivot 63 of the baffle or flapper 62 may be shifted back and forth, depending upon the relative pressures in the bellows chambers 70 and 71. The baffle or flapper 62 is disposed in front of a jet nozzle 72 leading from pipe 73. This pipe 73 is connected through a bleeding port or constriction 74 to a pipe 75 that leads to a source of compressed air. The pipe 75 also leads to a relay valve 76 having double but opposed valve seats 77 and 78. A pipe 79 leads from the chamber of the relay valve, between the valve seats, to the mechanism shown in Fig. 6 and which will be described later herein. A ball valve 80 is disposed between the valve seats 77 and 78 and is operated by a stem 81 which extends through the passage 82 from the valve seat 78. This stem 81 is connected to a bellows 83, the interior of which is connected to the pipe 73 between the constriction 74 and the jet opening 72. An adjustable sensitivity controller 84 and a reset controller 85 are also provided in the casing 45. The controller 84 is provided with a closed shell 86 having a partition 87 thereacross, and the partition has a port 88 opening from face to face thereof.

A valve element 89 carries a tapered valve pin 90 that extends through the port 88 until it engages endwise against the end of an adjustable abutment or screw 91 that is threaded through the shell 86. A spring 92 urges the valve element 89 toward the abutment or adjustment screw 91. The partition 87 divides the interior of the shell 86 into two chambers C and D, and the chamber C, in which the valve element 89 is disposed, is connected by a pipe 93 to the interior of the bellows chamber 70. The other chamber D is connected by a pipe 94 to the pipe 79. The reset controller is identical in construction with the controller 84 and it also has a partition 95 with a port 96 dividing the shell 97 into two chambers E and F. A valve element 89' with a tapered pin 90' is disposed in the chamber E, with the tapered or smaller end of the pin extending through the port 96 to abut against an adjustable abutment or screw 98 carried by the shell 97 and accessible for operation from the exterior thereof. A spring 92' urges the valve element 89' against the abutment 98. The chamber F of controller 85 is connected by a pipe 99 to the pipe 79, and the chamber E is connected by a pipe 100 to the bellows chamber 71.

The operation of the mechanism shown in Fig. 4 will now be explained. Compressed air at a controlled constant pressure is supplied by pipe 75 through the constriction 74 and the pipe 73 to the nozzle 72 where it is discharged to atmospheric pressure in a jet which impinges against the face of the flapper or baffle 62. As the baffle 62 is moved toward and from the nozzle 72, the escape of air through the nozzle 72 will be varied, the escape or discharge being decreased when the baffle 62 is moved toward the nozzle 72 and the discharge increased when the nozzle 72 is uncovered to a greater extent. The bellows 83 is responsive to the pressure in pipe 73 between the constriction 74 and the nozzle 72, and therefore, if the escape of compressed air through nozzle 72 is decreased by movement of the baffle 62 toward nozzle 72, the air pressure between constriction 74 and nozzle 72 correspondingly increases and expands the bellows 83, thereby moving stem 81 and the ball 80 towards the valve seat 77. The ball 80 then throttles flow of compressed air from pipe 75 into pipe 79, and opens wider the venting of pipe 79 into passage 82. If the baffle 62 is moved away from the nozzle 72, then the air will escape more rapidly from pipe 73, and pressure in the bellows 83 will fall so that atmospheric pressure will collapse the bellows and carry the ball 80 towards the valve seat 78. This will widen the opening between pipe 75 and pipe 79, and throttle the opening between pipe 79 and vent 82. Thus the pressure in pipe 79 is varied proportional to the expansion of bellows 83 and the corresponding setting of the baffle 62.

Air under pressure in pipe 79 may pass through pipe 94 into the chamber D, thence through the port 88 into chamber C, thence through pipe 93 to bellows 70. By varying the position of the adjustable abutment screw 91, one may vary the effective passage through port 88 and thus determine the time required for the air to pass from pipe 79 to the bellows 70. When pipe 79 is vented, the air which passed into bellows 70 will be released, and the bellows 70 will return to normal position. Similarly, when air under pressure is admitted to pipe 79 some will also pass through branch pipe 99 to chamber F of reset shell 97, thence through the port 96 to chamber E, thence by pipe 100 to the bellows 71. Thus, a change in the position of the baffle 62 beyond the nozzle 72 will cause a change in the pressure in the bellows 83, which, in turn, shifts the ball valve 80 into different positions between the seats 77 and 78 and thus regulates the effective air pressure in pipe 79. The passage of air from pipe 79 to the bellows 70 and 71 is controlled by the controllers 84 and 85 respectively, and the abutments or set screws 91 and 98 will be selectively adjusted so that the bellows 70 will have pressure built up therein at a rate different from the bellows 71.

Referring next to Fig. 6, the pipe 79 is connected to the interior of a bellows or expansion device 101 which is part of a pneumatic relay for controlling a diaphragm-operated motor 102. The mechanism shown in Fig. 6 is similar to the pilot or relay mechanism disclosed in United States patent to Edwards et al. #2,298,112 of October 6, 1942, to which reference may be had for a full disclosure of such mechanism. This type of mechanism is available on the open market, one suitable type being sold by Taylor Instrument Companies of Rochester, N. Y. and disclosed in its bulletin 84–R, October 1935 edition, and copyrighted in 1935 by Taylor Instrument Companies. In the Edwards patent the mechanism operates a valve, whereas in the present construction shown in Fig. 6, the mechanism operates a reciprocating sleeve which causes a shifting of speed control mechanism that will be explained later herein. The bellows 101 of the present construction corresponds to the bellows 33 of the Edwards patent.

Opposing expansion of the bellows 101 is a spring pressed pin 103 which is spring-pressed in the manner shown in said Edwards patent. Disposed between the bellows 101 and the spring-pressed pin 103 is one end of an arm 104 which is connected by rivet 105 to the free end of a lever 106 which is connected to an abutment or housing 107 by a frictionless pivot 108. The lever 106 includes as a section thereof, a flexible, resilient plate 109 at its end which is connected to the arm 104, and a spring 110 is connected to the arm 104 near its end that is connected to the flexible plate 109. Spring 110 urges the arm 104 upwardly and through it urges the free end of lever 106 upwardly. The diaphragm-operated motor 102 contains the usual imperforate diaphragm 111 which, when subjected to pressure on its upper face in Fig. 6, forces a plate 112 downwardly against the action of helical spring 113 which is compressed between a ring 114 of the motor frame and plate 112. Connected to the plate 112 is a tube 115 which slides through ring 114 in endwise, reciprocating movement to operate speed varying mechanism, which will be explained later herein.

The tube 115 is provided with a collar 116 fixed thereon and carrying an extending arm 117. The arm 117 is attached by pivot pin 118 to one end of a link 119, the other end of which is pivotally connected by a pin 120 to one end of a lever 121 which is pivoted on a relatively fixed pivot 122 carried by the housing in which the mechanism of Fig. 6 is mounted. A shiftable fulcrum 123 in the nature of a pin with a knurled periphery is disposed between the levers 106 and 121. When the pin 123 is rotated, it will roll lengthwise along and between the levers 106 and 121. The pin 123 regulates the stroke of tube 115 and the speed of pump 15, and by moving the pin 123, the range of travel of the tube 115 can be set within certain speed range limits of the speed changer, and the pressure developed in the diaphragm-operated motor 102 will always be high enough to move the tube 115 and still be under control of the pilot or relay mechanism disclosed in Figs. 1 and 6.

The arm 104 carries an angular bracket 125 which, at its free end, carries an adjustable screw or abutment 126 that extends toward the arm 104 and normally abuts against the free end of a baffle or flapper plate 127. A casing 128 is provided, across the face thereof, with a diaphragm 129 and with an interior partitionlike diaphragm 130. A relatively rigid yoke 131 connects the diaphragms 129 and 130 so that the two diaphragms move together. The diaphragm 130 and the casing 128 have between them a chamber G and the diaphragms 129 and 130 have between them a chamber H. The yoke 131 carries, outside of the casing 128, an inverted bridge 132 to which the plate 127 is connected through a flexible hinge 133. A tube 134 extends toward the flapper or baffle plate 127, and terminates in a jet port 135 so as to discharge air against the face of the baffle or flapper 127. The tube 134 is connected to chamber G in the casing 128. Compressed air from a suitable source is supplied through a pipe 136 to the interior of chamber H in the casing 128.

Within chamber H the pipe 136 terminates in a valve port 137. The part of the yoke 131 which is connected to the diaphragm 129 is also provided with a valve port 138 from face to face. A valve element 139 extends through the valve seat 138 into the chamber H and terminates in a valve head 140 which seats and unseats in the port 137 as the valve element 139 is moved endwise through port 138. The valve element has a conical valve head 141 which moves into engagement with the port or seat 138 in the yoke when the head 140 seats in the port 137. A spring 142 acts between the inverted bridge 132 and the valve element 139 to urge the latter in a direction to close the ports 137 and 138.

The chamber G of casing 128 is connected by a pipe 143 to the pipe 136, but the pipe 143 contains, in series therein, a constriction or bleeding port 144. The chamber H of casing 128 is also connected by pipe 145 to the air motor 102 which would be above the diaphragm 111.

When air under pressure is admitted to the pipe 79 from the pipe 75, as explained in connection with Fig. 4, it will enter the bellows 101, expand them against the pressure of pin 103 and raise the arm 104 so as to raise the bracket 125 thereon and carry the adjustable screw or abutment 126 in a direction away from the baffle or flapper 127. This allows the baffle or flapper 127, which is always urged by its flexible hinge 133 to approach the jet port 135 and restrict further escape of air from port 135 and the chamber G. The chamber G, as explained previously, is connected by pipe 143 and its constriction 144 to the pipe 136 which supplies compressed air. When the escape of air from port 135 is further restricted by the partial release of baffle or flapper 127, there will be a gradual building up of air pressure in the chamber G of casing 128, and this will force the yoke 131 downwardly in Fig. 6. This will carry the valve element 139 with it and unseat the head 140 from the port 137. Compressed air may now pass from pipe 136 directly into the chamber H of casing 128, and thus pass through the pipe 145 to the air motor 102 where it causes an advance of tube 115. The full pressure of the compressed air in pipe 136 will thus be available in the motor 102 to initiate an advance of tube 115, but when this advance begins, the arm 117 on the tube will advance through link 119 and will rock lever 121 about its relatively stationary fulcrum or pivot 122.

When the lever 121 is rocked counterclockwise in Fig. 6, it will depress the shiftable fulcrum 123 and through it will depress the lever 106 and rock it upon its frictionless pivot 108 in a clockwise direction. When the free end of lever 106 moves clockwise in this manner, it will move downwardly the right-hand end of arm 104 and thus while the bellows 101 acts as a temporary fulcrum, arm 104 will be rocked on such temporary fulcrum to carry the bracket 125, which is intermediate of its ends, toward the flapper or baffle 127. The abutment 126 is always in contact with the flapper or baffle 127, and therefore, this latest movement of the arm 104 will flex the flapper or baffle away from the port 135, which allows more air to escape from chamber G so that the pressure within the chamber G is reduced.

The diaphragms 129 and 130 will tend to return toward their former position which will tend to reseat the valve head 140 in port 137 and restrict flow of compressed air to motor 102. This slows down the rate of advance of the tube 115 by the motor 102. The tube 115 will require increasing pressure as it advances, which will be explained herein later in connection with Fig. 3, and therefore, a balance will be established for the position of the baffle or flapper 127 which will so restrict the escape of air from jet port 135 that the pressure in chamber G will be just sufficient to hold the yoke 131 in a position in which the port 137 will be open only far enough to maintain the desired air pressure on the motor 102. It will be recalled, from a description of the mechanism of Fig. 4, that the pressure in the pipe 79 will vary, and that it will in turn determine the position of the arm 104 under the action of the bellows 101. Therefore, an equilibrium will be established when the desired pressure on the air motor 102 is created.

Referring now to Fig. 3, the tube 115 operates a variable speed drive mechanism, and through it controls the speed of pump 15. Such mechanism is marketed by Reeves Pulley Co. of Columbus, Indiana, and is disclosed in its catalog #N-441. Other examples of such variable speed drives are disclosed in United States Patents Nos. 2,089,711 and 2,140,942 to which reference may be had for more complete details. In the illustrated example, it telescopes with and is mounted to move along a motor shaft 146. Fixed on the shaft 146 is one half 148 of a V-belt pulley and the other half 149 of that pulley is rotatably connected to the tube 115 by a coupling 149a. Both sections 148 and 149 are keyed to the shaft 146, so as to rotate therewith, yet the section 149 can move endwise along the shaft and will positively be moved by tube 115 toward the half 148 when pressure is applied to the diaphragm 111 of the air motor 102, and will be withdrawn away from the half 148 by the spring 113 of the air motor 102 when pressure on the diaphragm 111 is reduced. A speed reducer R has its rotatable shaft 150 provided with a fixed pulley half 151. The other half 152 is keyed to shaft 150 but is slidable thereon and a spring 153 is compressed between a collar 154 fixed on the shaft 150 and a hub 155 on the outer face of the pulley half 152. The inside faces of the pulley halves 148, 149, 151 and 152 are oblique to the axis of the shafts on which they are mounted so that they form V-shaped channels in which runs a driving belt 156.

The belt 156 is what is known as a V-belt because its two sides are tapered toward the center. Since the belt 156 is endless, it will be understood that when the pulley half 149 is pushed toward the half 148 by the endwise movement of tube 115, the belt 156 will ride on the periphery of that pulley further from the axis of the pulley, which causes increased tension on the belt that pulls the belt down between and separates the pulley halves 151 and 152 on the speed reducer shaft. This thus changes the drive ratio between the pulleys on the motor and on the shaft 150. Because of the progressively increasing force required to force the pulley section 149 towards the section 148, in addition to the increased compression of spring 113, progressively increasing pressure on diaphragm 111 of air motor 102 will be required. Hence it is possible, by causing selected air pressures in motor 102, to cause movement of sleeve 115 into different selected positions and hold it in such positions. When the tube 115 moves endwise to release the pulley section 149, the belt 156 can then ride down the bevelled side walls of pulley sections 148 and 149 towards the axis of the shaft 146, which releases the tension on the belt and then the spring 153 will be able to move the section 152 toward the section 151 and cause that end of the belt to run further from the motor shaft, thus decreasing the rate of drive of the shaft 150 from the motor or prime mover M.

This is a well known type of variable speed transmission except that the section 149 is moved by the tube 115, and the latter is moved by the mechanism shown in Fig. 6. The shaft 150 drives speed reducing mechanism in the housing R, and through it drives at a low speed a shaft 157 which is connected to and drives the rotor of the pump 15. With the mechanism described, the speed of the pump 15 will be varied in accordance with the position of the balance arm or pin 44, which in turn is responsive to the density of the liquid which is then in the separator 3.

It is important that the liquid level in the separator 3 be maintained substantially constant, and mechanism is illustrated in Figs. 1 and 5 for maintaining the liquid level constant through regulation of the rate of fresh liquid which is introduced through the pipe 13. Referring now to Fig. 1, a pipe 158 is connected to the housing of the separator 3 above the inlet from the pipe 2, and a valve 159 is provided in the pipe 158 at its lower end below the branch pipe 176 to the instrument 164. The lower end of the pipe 158 is connected through a pressure regulating valve 160 to a pipe 161 which supplies water under pressure. A branch pipe 162 is connected to the lower end of the pipe 158, between the valves 159 and 160, and pipe 162 in turn is connected through a manually operated valve 163 to the separator 3 well below the minimum liquid level in the separator 3.

In Fig. 1 the valves 159 and 163 are cracked or opened only very slightly so that the water, which is under constant pressure in the pipes 158 and 162, will discharge into the separator 3, well above and well below the liquid level therein at practically a small trickle. The water in the pipes 158 and 162 will thus be under a pressure determined by the setting of the pressure regulating valve 160, and which pressure in pipes 158 and 162 will always be sufficient to force water slowly into the separator 3 and prevent liquid from separator 3 from entering tubes 158 and 162. The pipes 158 and 162 extend below the connection of the pipe 162 to the separator 3, so that there are two columns of water of different lengths. The liquid pressure in the separator 3 which must be overcome in order for water to flow from pipe 162 into the separator is dependent upon the height of the column of liquid in the separator 3 above the opening from pipe 162 into the separator.

The height of the column above the opening of pipe 162 into separator 3 plus the vertical length of the column of water in pipe 162 will depend upon the liquid level in the separator 3. The column of water in the pipe 158 will always be uniform, since it will have the pressure determined by the weight of the column for the full length of the pipe 158. The difference between the weights of these two columns will vary with variations in the liquid level, and this principle is utilized in order to automatically regulate the liquid level in the separator 3 through the operation of the diaphragm operated valve 14.

The mechanism for accomplishing this is contained largely within a housing 164. The mechanism contained in housing 164 is similar to that disclosed in Fig. 4 except that the baffle or flapper 165, Fig. 5, which corresponds to baffle 62 in Fig. 4, is hinged at 166 to one end of a link 167, the other end of which is hinged by pin 168 to a lever 169 which in turn is pivoted on a stationary pivot 170. The adjustable fulcrum 171 of the baffle 165 is connected to a stem 172 which corresponds to the stem 64 of Fig. 4. The lever 169 has an arm 173 which is disposed between opposed bellows 174 and 175. The bellows 174 is connected by a pipe 176, Fig. 1, to the pipe 158 at the level 177, and the bellows 175 is connected by a pipe 178 to the pipe 162 at the same level 177. The level 177 is below the opening of pipe 162 into the separator 3, and therefore, the bellows 174 will be responsive to the weight of the column of water in the pipe 158 and the bellows 175 will be responsive to the weight of the column of water in the pipe 162 plus the weight of a column of liquid in separator 3 of similar cross section, both columns being the weight above the level 177, since the columns below level 177 balance each other.

As the relative pressures in the bellows 174 and 175 vary, the lever 173 will be rocked in one direction or the other, so as to move the baffle or flapper 165 toward or from the jet port 72a, which corresponds to port 72 of Fig. 4, and this movement by mechanism similar to that shown in the right half of Fig. 4 will deliver air under pressure through a pipe 179, Fig. 1 similar to pipe 79 of Figs. 4 and 6, to the diaphragm operated valve 14. The air for this mechanism is received from a pipe 180 which contains a pressure regulating valve 181 so that the air delivered to the regulating mechanism in the housing 164 will be uniform in pressure. Included in the pipe 179 is a three-way valve 182, to which is also connected a pipe 183 which is connected to the same source of air as pipe 180. Pipe 183 carries a pressure indicating gage 184 and a pressure regulating valve 185.

When starting the apparatus it is important to remove the control valve 14 from control of the automatic mechanism contained in the casing 164, and for this purpose the three-way valve 182 is operated to connect the pipe 183 to that part of the pipe 179 which leads to the valve 14, and close that part of pipe 179 that leads to the housing 164. This places the desired pressure on the air motor of the valve 14, so as to cause it to open and admit liquid to the evaporator. When the desired starting level in separator 3 has been reached, the three-way valve is again operated to connect together the sections of the pipe 179, and disconnect them from pipe 183.

In operation, the evaporator is first filled by manipulation of the three-way valve 182, and after it is approximately filled, this three-way valve 182 is returned to its former position where it connects the two sections of the pipe 179 and places the valve 14 under the control of the mechanism contained in the housing 164. The pump 41 is continuously operated, so that it circulates the liquid through the constant volume vessel or receptacle 23, the direction of circulation being upwardly through vessel 23. Because of the conical top and bottom of this receptacle, there will be no pockets in which the liquid will not be moving, and therefore, all of the liquid in this receptacle 23 will at all times properly represent the density of the liquid in the separator or flash chamber 23. The pump 5 also operates continuously so as to withdraw liquid from the bottom of the separator, circulates it downwardly through the steam chest where it is heated to the vaporizing temperature, and when the required evaporation takes place, then discharges it into the upper part of the separator 3. It impinges against the baffle plate 12 which separates liquid and vapor.

Since the interior of the separator 3 is connected to a condenser 3b through the dome 3a, the vapor will be removed from the separator and the remaining liquid will collect in the bottom of the separator. This will continue until the liquid in the separator 3 has a density or specific gravity approaching that desired. When this occurs, the pump 15 is started when pointer 57 approaches the set point in center of chart, and the weight of this circulating liquid in receptacle 23 will rock the beam 20 against the counterweights 29, which will raise the pin 44. The pin 44, as shown in Fig. 4, when moved in this manner, will rock the indicating pointer 57 and also the baffle or flapper 62 away from the nozzle 72, so as to increase the escape of air from the pipe 73. This will decrease the pressure in the bellows 83 and the latter will contract and force the ball valve 80 towards the seat 78 and away from seat 77. This restricts the escape of air from pipe 79 through the seat 78 and admits compressed air to the pipe 79.

Air under pressure passing through pipe 79 is delivered to the bellows 101, so as to lift the arm 104, Fig. 6, which allows baffle 127 to rise and restrict escape of air from jet port 135. This causes pressure to build up in the chamber G, and the diaphragms 129 and 130 will be flexed so as to carry the yoke 131 downwardly in Fig. 6 and open the port 137. This permits compressed air to enter chamber H through pipe 136 and pass through pipe 145 to the air motor 102, and build up enough pressure to move sleeve 115. This causes an operation of the air motor, during which sleeve 115 is advanced so as to push the pulley section 149, Fig. 3, toward the section 148. The belt 156 then rides higher on the pulley formed of sections 148 and 149, and since the belt is relatively inextensible, it separates the sections 151 and 152 and rides lower thereon. When this occurs the pulley halves 148 and 149 are the equivalent of a larger pulley and the halves 151 and 152 are the equivalent of a smaller pulley, and therefore, the pump 15 will be driven through the speed reducer R at a greater speed.

As the sleeve 115 begins to move, the pump speeds up its operation, but as the sleeve 115 advances, it rocks the lever 121 counterclockwise about 122 as a fulcrum in Fig. 6, and through the fulcrum 123, forces the lever 106 clockwise so as to pull the abutment 126 farther against the plate 127. Movement of plate 127 in this direction will uncover the port 135 so as to decrease the pressure in chamber G. This releases pressure on the diaphragm 130 which then shifts the yoke upwardly and partly closes the port 137, thus decreasing the travel of air to the motor 102 and resisting the pressure on the motor 102 to the extent necessary to hold pulleys in the new position. This provides ample power in the motor 102 to overcome friction and inertia of parts and make the necessary shift in the driving mechanism for the pump, without a quick jump in operation which would be likely to go too far and cause hunting. At the same time it allows the parts to place the baffle 127 at just the right position to maintain the desired pressure on the motor 102, in order to maintain the increased speed.

When the pump speeds up, the liquid level in the evaporator will drop, and immediately the mechanism shown in Figs. 1 and 5 will cause an operation of the valve 14 to increase the rate of fresh liquid entering the circulating system of the evaporator. The increase in fresh liquid entering the evaporator reduces the density, and then the scale beam 20 rocks in the opposite direction and lowers pin 44. This moves the flapper 62 towards the jet port 72 which reduces the escape of air from pipe 73. Pressure then builds up in bellows 83, and the latter, in expanding, forces ball valve 80 towards the seat 77 and away from seat 78. This reduces the pressure of the air supplied to the precisor mechanism shown in Fig. 6, by means of the pipe 79. Thereupon bellows 101, Fig. 6, will collapse slightly and lower arm 104, which, in turn, flexes 127 away from jet port 135. This allows air to escape more rapidly from chamber G, and diaphragm 130 can then partially return to its upper position which further closes the port 137 and decreases the air pressure on motor 102. After the port 137 is fully closed, the valve 141 will open as pressure in chamber G decreases further by the movement of yoke 131 away from valve 141, and that releases the pressure in chamber H so as to allow escape of air from the motor 102. This permits the spring 113 to retract the sleeve 115 (rise in Fig. 6) which decreases the speed of the pump through the mechanism in the right half of Fig. 3.

While the movement of the pin 44 caused by changes in density of liquid in receptacle 23 shifted the flapper or baffle 62, the sensitivity controller 84 (Fig. 4) prevented too abrupt movement of the baffle 62 by shifting the pivot 63. The reset mechanism 85 also became effective at the same time, but since the sensitivity controller 84 and the reset mechanism 85 are set to operate at different rates, this gives the proper regulation of the movement of the baffle plate 62 and prevents hunting. The weight 31 (Fig. 2), of course, is adjusted vertically on the depending rod 30 of the scale in making an initial setting for a particular liquid. This is used to establish a range of concentration to correspond to the full range of the regulating mechanism. The purpose of the automatic reset mechanism 85 is to maintain the desired concentration and density, regardless of the variation in the rate of discharge. When a change in concentration in the body of liquid takes place, the control instrument changes the rate of discharge by changing the rate of operation of the pump, so as to bring the concentration back to the desired extent.

With a standard, proportional response instrument as employed here, this is accomplished by a change in output pressure, but this new output pressure then establishes a new control point. The automatic reset 85 automatically compensates for movement of the instrument pointer 57 from the control point, varies the output pressure to bring the pointer back to the original control point, and thereby prevents the establishment of a new control point, corresponding to a different density than the one selected. The rate of change of output pressure varies directly with the deviation of the density from the control point. By suitable selection of the size of the pump, its range of speed, sensitivity of the instrument and reset rate, the desired control can be maintained without exceeding the range of the instrument.

Assuming, for example, that the concentration of the feed liquid entering the evaporator increases, it will be necessary to increase the rate of discharge of the pump 15 as long as this change lasts. More pressure must be supplied to the air motor 102 by the controlling mechanism shown in Fig. 6 and the pointer 57 will move away from the original set point. If the member 62 should remain at the new setting for any length of time, it would start to regulate the concentration of the discharge at a higher point, corresponding to this new setting, but by means of the automatic reset, the baffle 62 is returned to the original set point and the concentration is maintained at the desired point.

As the speed of the pump 15 increases, the liquid level in the evaporator chamber or separator 3 will start to fall and this decreases the pressure in the pipe 162 above the level 177, because the back pressure on pipe 162 will then decrease. In other words, the pressure in pipe 162 depends upon the weight of the column of liquid in the separator 3, plus the weight of the column in pipe 162. This unbalances the pressures in the bellows 174 and 175, see Fig. 5, and this unbalance shifts the baffle plate 165 in a manner to change the rate of escape through nozzle 72 and thus vary the pressure of the air supplied through pipe 179 to the air motor operated valve 14. This opens the valve 14 a little farther so as to add liquid to raise the level in separator 3 back until the pressures in pipes 162 and 158 are again balanced. The valve 14 will, during running, seldom be fully closed or opened but will be partially opened to an extent which supplies the liquid at such a rate as to maintain the liquid level substantially uniform in the separator 3.

It will be observed that with this arrangement there is a continuous type of specific gravity or density controller, in which the indication is precise and free from control restraints, yet the control is sensitive to minute changes in density. The scale is sensitive because the volume of the container 23 is relatively large, which gives a desired movement of the scale with slight changes in the density of the liquid which is circulating therethrough. Thus the rate of net flow of the liquid through the evaporator is automatically controlled by the density of the liquid, and it has been found that the density may be kept uniform within very close limits. The automatic restorative response in the controls slows down its action and permits smooth or proportional changes rather than abrupt or extensive changes. The automatic reset 85 not only eliminates shift in equilibrium or average value of any variables owing to inherent characteristics of automatic controllers, but also controls the operation during the transition period and provides a smooth change without violent fluctuations in density and maintains the selected density during this period. In the joint use of the density controller and the liquid level controller, each is connected to vary the flow at one side of the evaporator, and the density controller changes the rate of flow through the evaporator and the liquid level controller follows this change to stabilize the net flow at the new rate. Thus we have automatic and very accurate control of the net flow through the evaporator, according to specific gravity changes in the liquid leaving the evaporator, by means of power operated instrumentalities that are set and accurately controlled by the density.

It should be particularly noted that the precisor shown in Fig. 6 serves the double purpose of providing sufficient pressure on the diaphragm 111 in motor 102 to assure prompt response and movement of the speed control mechanism, and also to restrict this movement in order to vary the pump speed between a predetermined minimum and maximum in accordance with the established capacity of the evaporator, in order to prevent too extreme changes in speed and keep these changes within moderate limits.

It will be understood that various changes in the details and arrangements of parts, which have been herein described and illustrated in order to explain the nature of the invention, may be made by those skilled in the art within the principle and scope of the invention as expressed in the appended claims.

We claim:

1. In an evaporator for increasing the density of a liquid, of the type having an evaporator chamber only partially filled with a liquid, into which the liquid to be concentrated is introduced into said chamber at the top, and the concentrated liquid removed from the bottom of said chamber progressively, that improvement which comprises the combination therewith of a weighing scale, a vertically elongated, closed container supported by said scale and having horizontally extending, flexible connections opening into the said container, one at the upper end of said container, and the other at the lower end of said container, the upper connection opening into said chamber above the liquid level therein, and the lower connection opening into said chamber at the bottom thereof, a continuously operating pump in series in said lower connection for forcibly circulating a portion of the liquid of said chamber solely and continuously through said container, so that the weight of liquid in said container will be a continuing indication of the density of the liquid in the chamber, means connected to the bottom of said chamber for removing concentrated liquid therefrom at a selectively variable rate, variable speed means for operating said removing means to cause removal of liquid from the chamber, a fluid controlled motor connected to said variable speed means for operating the same to cause an increase or decrease in the rate of permanent removal of concentrate in response to variations in fluid pressure on said motor, and means controlled by said scale for varying the fluid pressure on said motor in proportion to the deviation of said scale from a selected position, and operative to cause an increase in the rate of permanent removal of liquid from said chamber when the scale indicates an increase of the density in the liquid moving through said container, and a decrease in the rate of removal of liquid from said chamber when the scale indicates a decrease in the density of the liquid moving through said chamber.

2. In an evaporator of the type where liquid to be concentrated is introduced into an evaporator chamber through one conduit and the concentrated liquid is removed through another conduit, the combination of said evaporator and its chamber, said inlet conduit connected to the upper part of said evaporator chamber, said outlet conduit connected to the lower part of said chamber to remove concentrated liquid, a pump in series in said outlet conduit, variable speed means for regulating the rate of operation of said pump, a fluid operated motor for operating said variable speed means to vary the speed of operation of said pump proportionally to the air pressure on said motor, a weigh scale, a vertically elongated closed container supported by said scale, means separate from the recirculation flow of liquid through said evaporator for continuously circulating concentrated liquid from one part of said evaporator upwardly through said container and back to another part of said evaporator, and means controlled by the position of said scale for varying the pressure of fluid on said motor proportionally to the deviation of said scale from a selected standard position, whereby the speed of operation of said pump will be varied, automatically, by the density of liquid circulating through said container.

3. In an evaporator for continuously concentrating a liquid to a desired, uniform specific gravity, that improvement which comprises an evaporating chamber, an inlet conduit connected to the upper part of said chamber for delivering fresh, thin liquid to be concentrated, into the upper part of said chamber, an outlet conduit leading from the lower part of said chamber, a pump in said outlet conduit, variable speed means for operating said pump, an air motor connected to said variable speed means for changing the speed of operation of the pump in accordance with the air pressure on said motor, a weigh scale of the balance beam type, a closed container suspended from one arm of said scale beam, freely flexible hose connections leading approximately horizontally from the top and bottom ends of said container and connected to the evaporator chamber, with one connection below the liquid level in the chamber, means distinct from said outlet conduit for continuously and locally circulating liquid from said chamber upwardly through said container, and back to said chamber, a member extending from said balance beam, and means controlled by said member for varying the air pressure on said motor in proportion to the movement of said balance beam from a selected position occupied when the weight of liquid in said container indicates a desired density for the liquid.

4. In a continuous type evaporator for concentrating a liquid to a desired uniform specific gravity in which a liquid in process is passed through an evaporator chamber, the combination of said chamber, variable liquid moving means for passing liquid in process through said chamber, a weighing beam, a vertically elongated, closed container supported by said beam, flexible conduits connected to and extending generally horizontally from opposite ends of said container and connected to said chamber to form a closed liquid circuit therewith, a pump in series in said circuit, and withdrawing liquid from said chamber and circulating it continuously through said container, to maintain the container filled with circulating liquid, a power driven regulator operatively connected to vary said progressing means, and an independently powered sensitive control device controlled by said beam and in turn controlling said regulator for causing changes in the rate of liquid flow through said chamber in response to changes in the position of said beam.

5. In a continuous evaporator for concentrating a liquid to a desired uniform specific gravity in which a liquid in process is passed through an evaporator chamber, the combination of said chamber, variable liquid progressing means for passing liquid in process through said chamber, a weighing device, a vertically elongated, closed container supporting by said device, flexible conduits connected to opposite ends of said container and connected to said evaporator chamber to form therewith a local, closed circulatory circuit, a continuously running pump in series in said circuit for causing continuous, local circulation of liquid in process from said evaporator upwardly through said container and back to said evaporator, said weighing device having a member movable proportionately to variations in the weight of said container and liquid contents, power operated means for operating said liquid progressing means, an independently powered pilot medium controlled in activity by said member and in turn controlling the activity of said power operated means proportionately to the movement of said member from a selected position.

6. In a continuous evaporator for concentrating a liquid to a desired uniform specific gravity, the combination of an evaporator chamber, a pipe connected to the evaporator chamber, a pump in series in said pipe, a main motor, a variable speed driving connection from said main motor to said pump for operating the pump, a diaphragm motor for operating said connection to vary the speed ratio between the main motor and pump, means responsive to a liquid density condition in said chamber and having a member movable in response to chanages in that condition, and a pilot fluid device for varying the fluid pressure on said diaphragm motor to vary the speed of operation of the pump, and in turn controlled by relative movements of said member to cause variations in the pump speed proportionally to deviations of said member from a selected position.

7. In a continuous evaporator for concentrating a liquid to a desired uniform specific gravity, the combination of an evaporator chamber, a pipe connected to the evaporator chamber, a pump in series in said pipe, a main motor, a variable speed driving connection from said main motor to said pump for operating the pump, an independently powered motor operable to vary the speed ratio between the main motor and the pump, means responsive to a liquid density condition in said chamber and having a member movable in response to changes in that condition, and a pilot device for controlling the independently powered motor to vary said speed ratio and through it the speed of operation of said pump, said pilot device being controlled by relative movements of said member to cause variations in the speed of the pump proportionally to deviations of said member from a selected position.

8. In a continuous evaporator for concentrating a liquid to a desired uniform specific gravity, the combination of an evaporator chamber, variable liquid progressing means for passing liquid in process through said chamber, a weigh device, an upright, vertically elongated, closed container supported by said weigh device and having horizontally extending flexible connections opening into the top and bottom of said container, pipes connecting said connections to said chamber with the pipe from the lower flexible connection opening into said chamber below the liquid level therein, a continuously running pump in the pipe between the chamber and the flexible connection to the lower end of the container, said pump, pipes, flexible connections, container and chamber forming a local circulatory path through said container, variable speed means for operating said progressing means, and an independently powered motor operable to regulate said variable speed means to vary the speed of said progressing means, and a pilot device for controlling said independently powered motor but in turn controlled by said weigh device in response to variations in the weight of said container and its contents from a selected weight.

9. In a continuous evaporator for concentrating a liquid to a desired uniform specific gravity, the combination of an evaporator chamber, an inlet connection opening into one part of said chamber through which liquid to be concentrated is introduced, an outlet connection opening into a remote part of said chamber for permanently removing concentrated liquid from said chamber, means for continuously recirculating the liquid in said chamber, by completely removing liquid from one part of said chamber and returning it to the chamber at a part remote from the part where it was removed, a conduit connected to said chamber, a main pump in said conduit to cause fluid flow through said conduit, a weighing device, an upright vertically elongated, closed container supported entirely by said weighing device and having flexible connections from its top and bottom leading to said chamber, with the lower of said connections opening into said chamber below the liquid level therein, a continuously running pump connected solely in series in one of said connections for continuously circulating a portion of said liquid from said chamber through said container and back to said chamber, a main power device for operating said main pump at variable speeds, an independently powered, pilot control device for controlling the speed of operation of said main pump by said main power device, and in turn responsive to and controlled by the weight of the liquid contents of said container.

10. In a continuous evaporator for concentrating a liquid to a desired uniform specific gravity, the combination of an evaporator chamber, an inlet connection opening into one part of said chamber through which liquid to be concentrated is introduced, an outlet connection opening into a remote part of said chamber for permanently removing concentrated liquid from said chamber, means for continuously recirculating the liquid in said chamber, by completely removing liquid from one part of said chamber and returning it to the chamber at a part remote from the part where it was removed, a main pump in said outlet connection to cause fluid flow therethrough, a weigh beam, a vertically elongated, closed container carried by one arm of said beam and having flexible pipe connections from its top and bottom to said chamber, with one of its connections opening into said chamber below the liquid level in the chamber, a continuously running pump connected in series with one of said connections and circulating a portion of said liquid from said chamber through said container and back to said chamber, a main power device, a variable speed connection from said power device to said main pump for operating said main pump at variable speeds, a motor operable on said variable speed connection to vary the speed at which said main pump is operated, an independently powered, pilot control for controlling said motor that varies the speed of operation of said main pump by said main power device, and an element on said beam for controlling said pilot control device.

11. In a continuous evaporator for concentrating a liquid to a desired, uniform specific gravity, the combination of an evaporating chamber, an inlet connection opening into one part of said chamber through which liquid to be concentrated is introduced, an outlet connection opening into a remote part of said chamber for permanently removing concentrated liquid from said chamber, means for continuously recirculating the liquid in said chamber, by completely removing liquid from one part of said chamber and returning it to the chamber at a part remote from the part where it was removed, a conduit connected to said chamber, variable flow causing means in said conduit, a weigh beam, a vertically elongated, closed container carried by one arm of said beam and having flexible pipe connections from its top and bottom to said chamber, one of which opens into said chamber below the liquid level therein, a continuously operating pump in series in one of said connections and circulating a portion of the liquid in said chamber through said container and back to the chamber, a power operated device entirely distinct from said pump for operating said variable flow causing means in said conduit, and including a variable speed drive between the power operated device and said flow causing means an independently powered motor for regulating said variable speed drive, and a pilot device controlling said independently powered motor, and in turn controlled by said beam for causing action of flow causing means in said conduit in response to deviation of said beam from a selected weighing position.

12. In apparatus for continuously modifying a stream of liquid in process to discharge it with a selected uniform density, the combination of a modifying chamber through which said stream is passed and having an inlet and an outlet, liquid sampling means including a closed circuit having, in series therein, a continuously running pump, a constant volume vessel and said chamber, for continuously recirculating liquid in said closed circuit, said vessel and said chamber, means for variably controlling the rate of flow of said liquid in said stream into said chamber, means including a pump for variably controlling the removal of modified liquid from said chamber permanently, a pilot controlled device for controlling one of said variable controlling means, another and separate pilot controlled device for controlling the other of said variable controlling means, mechanism including a freely deflectable control flapper shiftable automatically in response to changes in weight of the liquid in said vessel for controlling one of said pilot controlled devices, additional and separate mechanism including another freely deflectable control flapper automatically responsive to changes in the liquid level in said chamber for controlling the other of said pilot controlled devices.

13. Apparatus according to claim 12, in which said flapper responsive to changes in density of the liquid controls the rate of discharge of liquid from said chamber and in which said flapper responsive to changes in liquid level controls the inflow of liquid to said chamber.

14. The method of continuously evaporating a liquid to a selected and uniform specific gravity, which comprises heating and recirculating a body of liquid to be concentrated in a confined space in a selected, circulating pattern through a series of zones in succession, removing vapors from said circulating body in one zone of said space and condensing them as a separate body outside of said space, removing parts of said circulating body, as the concentrated liquid one for sampling and one for permanent removal, from the portion of said circulating body in a successive zone after removal of vapors therefrom, adding fresh liquid to be concentrated to said circulating body after removal of said concentrated liquid in said successive zone before said body again reaches said one zone, continuously weighing a moving and fresh sample of the removed concentrated liquid, controlling a sensitive pilot medium by the deviations in the weight of said sample, and varying the flow of liquid out of said body by said pilot medium.

References Cited in the file of this patent

UNITED STATES PATENTS

| Number | Name | Date |
|---|---|---|
| 559,857 | Lillie | May 12, 1896 |
| 881,351 | Smith | Mar. 10, 1908 |
| 1,511,604 | Ganucheau | Oct. 9, 1924 |
| 1,575,643 | Salich | Mar. 9, 1926 |
| 1,943,106 | Burnham | Jan. 9, 1934 |
| 2,015,680 | Kermer | Oct. 1, 1935 |
| 2,040,357 | Chalatow | May 12, 1936 |
| 2,073,825 | Beck et al. | Mar. 16, 1937 |
| 2,140,942 | Reeves et al. | Dec. 20, 1938 |
| 2,294,501 | Junkins | Sept. 1, 1942 |
| 2,298,112 | Edwards et al. | Oct. 6, 1942 |
| 2,343,464 | Lienau et al. | Mar. 7, 1944 |
| 2,361,885 | Tate et al. | Oct. 1, 1944 |
| 2,367,215 | House | Jan. 16, 1945 |
| 2,409,768 | Lavett et al. | Oct. 22, 1946 |
| 2,453,210 | Eaton | Nov. 9, 1948 |

FOREIGN PATENTS

| Number | Country | Date |
|---|---|---|
| 82,473 | Switzerland | Jan. 29, 1935 |